United States Patent
Kang et al.

(10) Patent No.: US 11,618,403 B2
(45) Date of Patent: Apr. 4, 2023

(54) VEHICLE SEAT CUSHION AIRBAG, CONTROL SYSTEM AND CONTROL METHOD THEREOF

(71) Applicants: Hyundai Motor Company, Seoul (KR); Kia Corporation, Seoul (KR)

(72) Inventors: Seung Kyu Kang, Gyeonggi-do (KR); Sung Ung Ryu, Seoul (KR); Seoung Hyun Lee, Seoul (KR); Han Jo Jeong, Gyeonggi-do (KR); Myeong Hwan Kim, Gyeonggi-do (KR); Dae Hyun Choi, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/464,219

(22) Filed: Sep. 1, 2021

(65) Prior Publication Data

US 2022/0289132 A1 Sep. 15, 2022

(30) Foreign Application Priority Data

Mar. 12, 2021 (KR) .................. 10-2021-0032739

(51) Int. Cl.
*B60R 21/207* (2006.01)
*B60R 21/2338* (2011.01)
*B60R 21/231* (2011.01)
*B60R 21/16* (2006.01)

(52) U.S. Cl.
CPC .......... *B60R 21/207* (2013.01); *B60R 21/231* (2013.01); *B60R 21/2338* (2013.01); *B60R 2021/161* (2013.01); *B60R 2021/23382* (2013.01); *B60R 2021/23386* (2013.01)

(58) Field of Classification Search
CPC .............. B60R 21/207; B60R 21/2338; B60R 21/231; B60R 2021/23382; B60R 2021/23386; B60R 2021/161; B60R 2021/0051; B60R 2021/0053; B60R 2021/0004; B60R 2021/23169
USPC ............................... 280/730.1, 743.1, 743.2
See application file for complete search history.

(56) References Cited

U.S. PATENT DOCUMENTS

| 2005/0149284 | A1* | 7/2005 | Nathan | B60N 2/002 |
| | | | | 324/207.13 |
| 2018/0126941 | A1* | 5/2018 | Faruque | B60R 21/2338 |
| 2020/0298984 | A1* | 9/2020 | Walker | B60R 21/207 |
| 2021/0155194 | A1* | 5/2021 | Goswami | B60R 21/207 |

FOREIGN PATENT DOCUMENTS

| CN | 102874202 A | * | 1/2013 | .......... B60R 21/207 |
| CN | 207697554 U | * | 8/2018 | |
| JP | 2014-031080 A | | 2/2014 | |
| JP | 2017-030446 A | | 2/2017 | |
| JP | 2019-137305 A | | 8/2019 | |

(Continued)

*Primary Examiner* — Keith J Frisby
(74) *Attorney, Agent, or Firm* — Fox Rothschild LLP

(57) ABSTRACT

A seat cushion airbag for a vehicle includes an airbag cushion that is formed with a center part installed in a center of or around a front part of a seat cushion of a vehicle and is located between legs of a passenger when being deployed. An extension part extends on both sides of the center part and is located above the legs of the passenger and an inflator is connected to the airbag cushion and provides an expansion force to the airbag cushion.

17 Claims, 9 Drawing Sheets

(56) References Cited

FOREIGN PATENT DOCUMENTS

| KR | 10-1997-0036619 | 7/1997 |
| KR | 1997-0039684 | 7/1997 |
| KR | 2005-0018414 A | 2/2005 |
| KR | 101405379 B1 | 6/2014 |
| KR | 2016-0036816 A | 4/2016 |
| KR | 2019-0029895 A | 3/2019 |

* cited by examiner

VEHICLE SEAT CUSHION AIRBAG, CONTROL SYSTEM AND CONTROL METHOD THEREOF

CROSS REFERENCE TO RELATED APPLICATION

The present application claims priority of Korean Patent Application No. 10-2021-0032739 filed on Mar. 12, 2021, the entire contents of which is incorporated herein for all purposes by this reference.

BACKGROUND

Field of the Disclosure

The present disclosure relates to a seat cushion airbag for a vehicle, and technology related to an airbag that is deployed from a seat cushion to prevent a passenger from sliding forward from the seat cushion in case of a vehicle crash.

Even when fastening a seatbelt, accidents, injuries, and deaths may occur through abdominal compression due to a wrap belt of a seatbelt, which restrains the pelvis, as a lower body of a seated person slides forward in case of a vehicle crash. Such a phenomenon in which the lower body of the seated person moves forward during a vehicle collision to destabilize the seating posture and behavior of the seated person is called a submarine phenomenon. Such a submarine phenomenon mainly occurs due to incorrect wearing, such as loose fastening of the seatbelt or excessive reclining of a seatback, but frequently occurs depending on the posture of the seated person during the accident even when the seatbelt is worn properly.

A seat cushion airbag in the related art prevents the submarine phenomenon by being deployed from a seat cushion to make the legs of a passenger directed upward, but has the problems in that since the legs of the passenger is directed upward, the knees of the passenger collide with vehicle interior components to cause the occurrence of injury.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is proposed to solve the above-mentioned problems, and an object of the present disclosure is to prevent a submarine phenomenon from occurring in case that a vehicle crash accident occurs by deploying an airbag cushion installed on a front part of a seat cushion between the legs of a passenger and locating the fully deployed airbag cushion between the legs of the passenger and above the legs.

A seat cushion airbag for a vehicle according to the present disclosure may include: an airbag cushion formed with a center part installed in a center of or around a front part of a seat cushion of a vehicle and located between legs of a passenger when being deployed, and an extension part extended on both sides of the center part and located above the legs of the passenger; and an inflator connected to the airbag cushion and providing an expansion force to the airbag cushion.

The inflator may be connected to the center part to inject gas inside, and the center part may communicate with the extension part, to deploy the extension part after deployment of the center part. The seat cushion airbag may further include: a cushion housing accommodating the airbag cushion therein; and a cushion bracket combining the cushion housing and the inflator with a front part of a seat frame in a state where the airbag cushion is accommodated in the cushion housing. The seat cushion airbag may further include an internal tether located inside the airbag cushion, and having a first end part connected to a frame of the seat cushion and a second end part connected to the extension part to support the airbag cushion.

The internal tether may include a first tether having a first end part connected to the frame of the seat cushion and extended along the center part, a second tether connected to a second end part of the first tether and formed in a link structure to be folded before being deployed and to be deployed toward the extension part when being deployed, and a third tether extended from both end parts of the second tether and connected to the extension part. The first tether and the third tether may be formed of a deformable fabric material, and the second tether may be formed of a hard synthetic resin material.

The seat cushion airbag may further include an external tether formed with a support part having a first end part connected to a rear end part of a seat cushion frame and extended toward a front end part of the seat cushion frame, and a branch part branched from a second end of the support part toward the extension part and connected to the extension part. The extension part may include a tether hole penetrated by the branch part, wherein the branch part penetrates the tether hole and is connected to the extension part through connection of respective end parts thereof to the internal tether.

The seat cushion airbag may further include a cushion housing accommodating the airbag cushion therein and combined with the seat cushion frame, wherein a lead hole is formed on the cushion housing to allow the external tether to pass through the lead hole and is connected toward a rear end part of a seat frame. The center part may include a projection part formed to project toward the passenger, wherein the projection part supports a forward movement of a pelvis portion of the passenger.

A system for controlling a seat cushion airbag for a vehicle according to the present disclosure may include: a cushion detector connected to a pressure sensor provided on a seat cushion and calculating a pressure distribution pressurized onto the seat cushion; and a controller configured to execute deployment of an airbag cushion through reception of an input of a vehicle crash signal based on the pressure distribution of the seat cushion calculated by the cushion detector.

When the cushion detector calculates the pressure distribution toward a rear part of the seat cushion, the controller may be configured to operate the airbag cushion not to be deployed when the crash signal is input. When the cushion detector calculates the pressure distribution toward both sides of a front part of the seat cushion, the controller may be configured to operate the airbag cushion to be deployed when the crash signal is input. In response to the cushion detector calculating the pressure distribution toward a center of a front part of the seat cushion, the controller may be configured to operate the airbag cushion not to be deployed when the crash signal is input.

A method for controlling a seat cushion airbag control system for a vehicle according to the present disclosure may include: detecting a cushion by calculating a pressure distribution pressurized onto a seat cushion; determining a location of the pressure distribution detected at the cushion detecting; and controlling deployment of an airbag cushion based on the location of the pressure distribution determined at the determining.

The deployment control may include operating the airbag cushion not to be deployed when the pressure distribution toward a rear part of the seat cushion is calculated during the cushion detection. In addition, the deployment control may include deploying the airbag cushion when a crash signal is input in case that the pressure distribution toward both sides of a front part of the seat cushion is calculated at the cushion detecting. The deployment control may further include operating the airbag cushion not to be deployed when the pressure distribution toward a center of a front part of the seat cushion is calculated at the cushion detecting.

Since the vehicle cushion airbag according to the present disclosure is deployed upward from the front part of the seat cushion, the center part of the airbag cushion is located between the legs of the passenger, and the extension part thereof is located above the legs of the passenger. Accordingly, when the vehicle crash accident occurs, the legs of the passenger are supported in front of the seat cushion, and thus the submarine phenomenon in which the legs of the passenger move to the front of the vehicle can be prevented.

Further, since the vehicle cushion airbag control system according to the present disclosure determines the seating posture of the passenger through the pressure sensor provided on the cushion and determines whether to deploy the vehicle cushion airbag based on the seating posture of the passenger, the vehicle cushion airbag is not deployed to reduce costs in case that the deployment of the vehicle cushion airbag is not necessary, and the vehicle cushion airbag is not deployed to prevent the passenger from being injured due to the deployment of the vehicle cushion airbag when the passenger is injured by the deployment of the vehicle cushion airbag.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
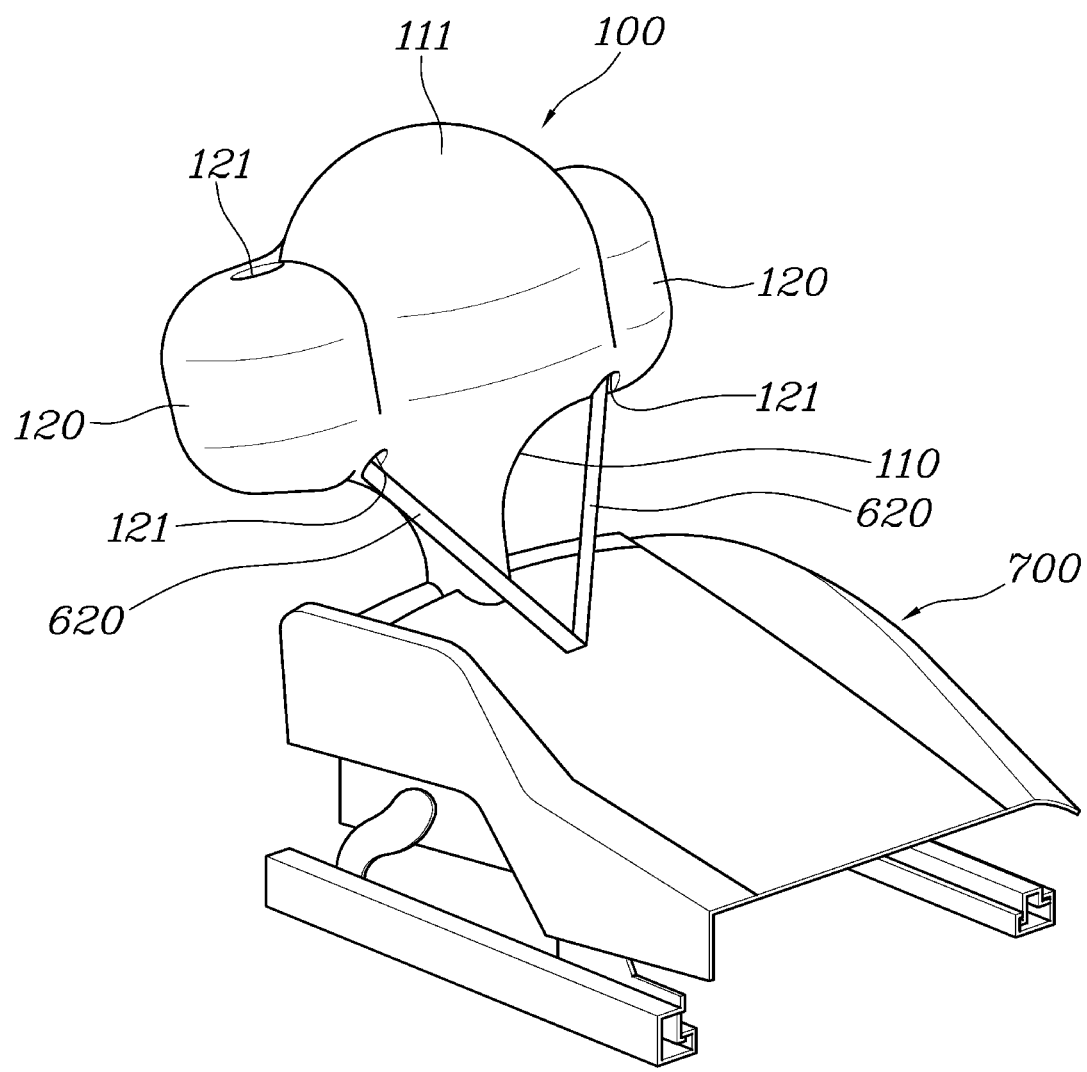
FIG. 1 is a perspective view of a deployed vehicle cushion airbag according to an embodiment of the present disclosure.

Specific structural and/or functional explanations on embodiments of the present disclosure disclosed in the present specification or application are merely exemplified for the purpose of explaining the embodiments of the present disclosure, and the embodiments according to the present disclosure may be carried out in various forms, and should not be interpreted to be limited to the embodiments described in the present specification or application.

Since embodiments according to the present disclosure may be variously modified and may have various forms, specific embodiments will be exemplified in the drawings and will be described in detail in the present specification or application. However, it should be understood that the embodiments according to the concept of the present disclosure are not limited to the specific disclosed forms, but include all modifications, equivalents, and/or alternatives that are included in the idea and technical scope of the present disclosure.

The terms, such as "first and/or second", may be used to describe diverse constituent elements, but the constituent elements should not be limited by the terms. The terms are only for the purpose of discriminating one constituent element from another constituent element, and for example, without departing from the scope according to the concept of the present disclosure, a first constituent element may be called a second constituent element, and the second constituent element may be called the first constituent element in a similar manner.

It should be understood that if a certain constituent element is mentioned to be "connected" or "coupled" to another constituent element, it includes both a case that the certain constituent element is directly connected or coupled to the another constituent element and a case that the certain constituent element is connected or coupled to the another constituent element via still another constituent element. In contrast, if a certain constituent element is mentioned to be "directly connected or coupled" to another constituent element, it should be understood that the certain constituent element is connected or coupled to another constituent element without intervention of any other constituent element Other expressions for explaining the relationship between the constituent elements, that is, "between" and "just between" or "neighboring" and "directly neighboring" should be interpreted in the same manner.

The terms used in the present specification are used to describe specific embodiments only, but are not intended to limit the present disclosure. A singular expression includes a plural expression unless clearly defined in a different manner. In the present specification, it should be understood that the term "include" or "have" specifies the presence of stated features, numerals, steps, operations, constituent elements, parts, or a combination thereof, but does not preclude the presence or addition of one or more other features, numerals, steps, operations, constituent elements, parts, or a combination thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless otherwise defined, all terms (including technical and scientific terms) used herein have the same meanings as those commonly understood by those ordinary skilled in the art to which the present disclosure belongs. The terms that are used in the present specification and are defined in a generally used dictionary should be interpreted as meanings that match with the meanings of the terms from the context of the related technology, and they are not interpreted as an ideally or excessively formal meaning unless clearly defined.

Hereinafter, the present disclosure will be described in detail through description of preferred embodiments of the present disclosure with reference to the accompanying drawings. The same reference numerals proposed in the respective drawings denote the same members.

Figure 2:
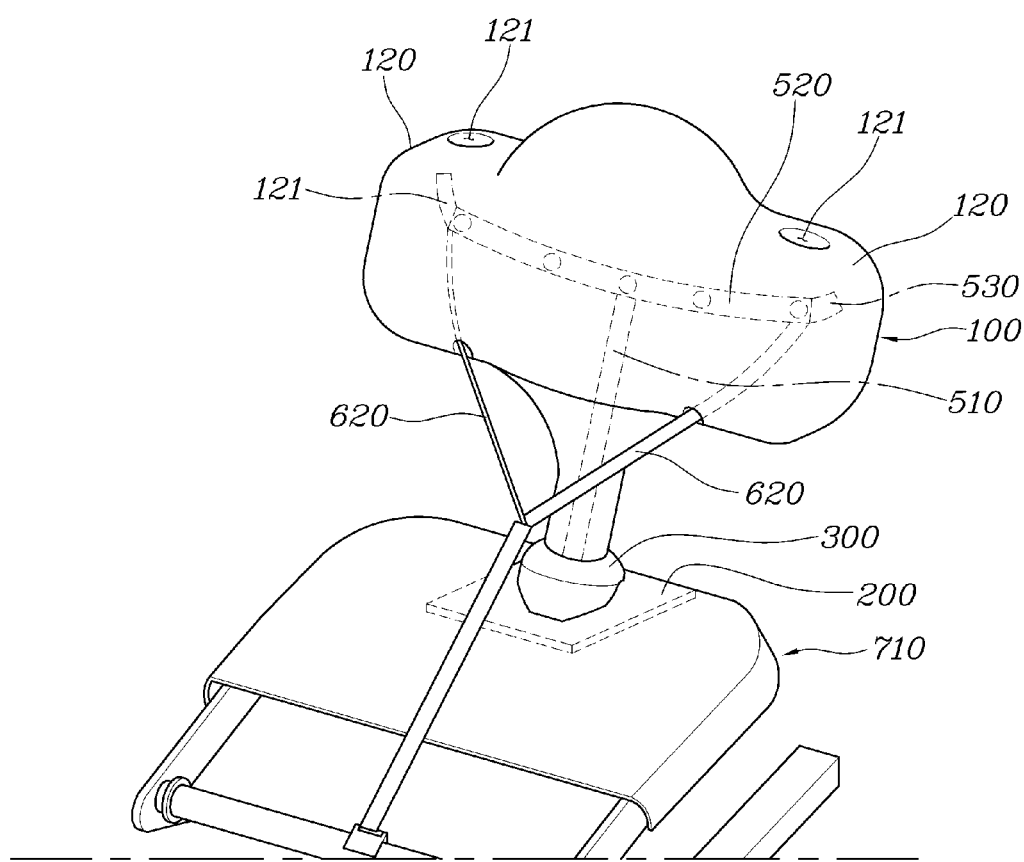
FIG. 2 is a perspective view of a vehicle cushion airbag excluding a seat cushion according to an embodiment of the present disclosure.
Figure 3:
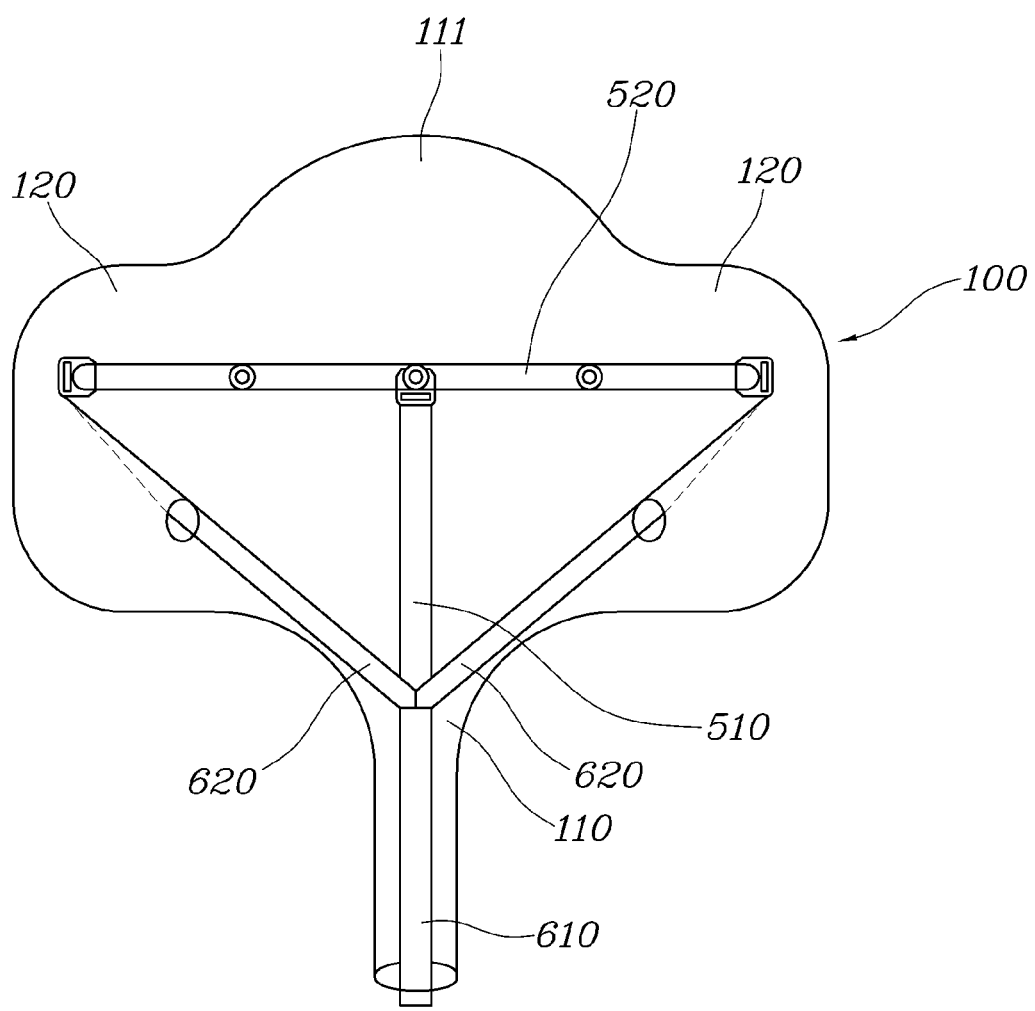
FIG. 3 is a cross-sectional view of an airbag cushion in a vehicle cushion airbag according to an embodiment of the present disclosure.
Figure 4:
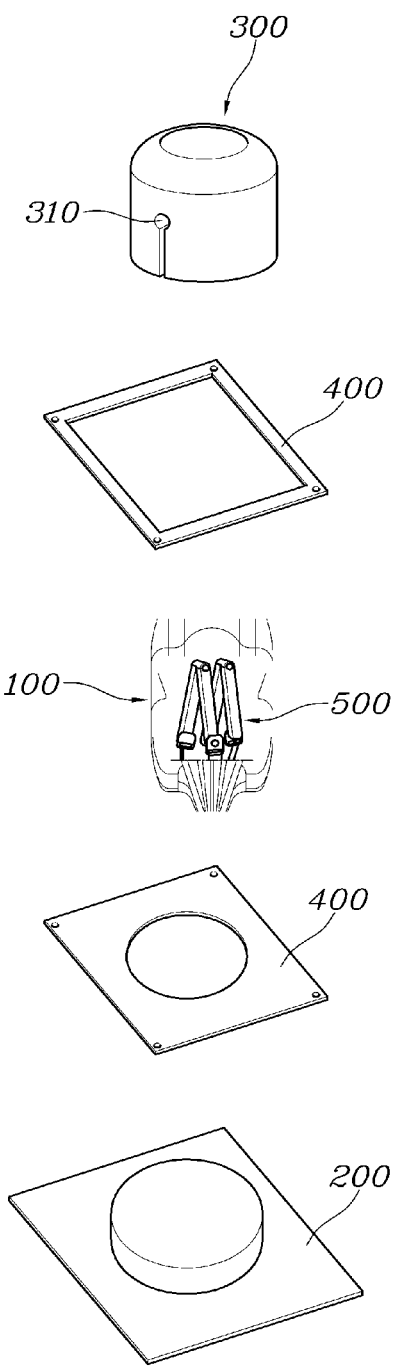
FIG. 4 is an exploded perspective view of a vehicle cushion airbag according to an embodiment of the present disclosure.
Figure 5:
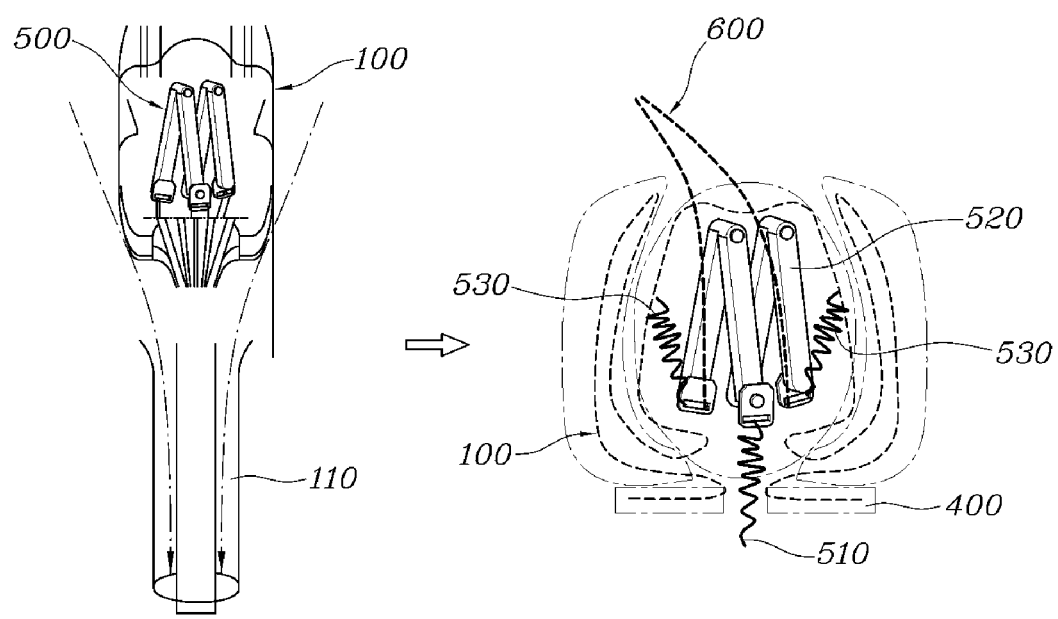
FIG. 5 is a view illustrating folding of an airbag cushion of a vehicle cushion airbag according to an embodiment of the present disclosure.

FIG. 1 is a perspective view of a deployed vehicle cushion airbag according to an embodiment of the present disclosure, FIG. 2 is a perspective view of a vehicle cushion airbag excluding a seat cushion 700 according to an embodiment of the present disclosure, FIG. 3 is a cross-sectional view of an airbag cushion 100 in a vehicle cushion airbag according to an embodiment of the present disclosure, FIG. 4 is an exploded perspective view of a vehicle cushion airbag according to an embodiment of the present disclosure, and FIG. 5 is a view illustrating folding of an airbag cushion 100 of a vehicle cushion airbag according to an embodiment of the present disclosure.

Referring to FIGS. 1 to 5, an airbag of a vehicle seat cushion 700 according to preferred embodiments of the present disclosure will be described. An airbag of a vehicle seat cushion 700 according to the present disclosure is deployed from the seat cushion 700, and supports the lower body of a passenger when a vehicle crash accident occurs. Through this, the lower body of the passenger moves forward in a state where the passenger is seated in a relaxation posture in which the upper body of the passenger is laid on his/her back, and thus the passenger may be prevented from being injured due to pressing of the passenger's upper body through the seatbelt or collision of the passenger's lower body with the front vehicle interior.

The airbag of the vehicle seat cushion 700 according to the present disclosure may include: an airbag cushion 100 formed with a center part 110 installed in a center of or around a front part of the seat cushion 700 of the vehicle and located between the legs of the passenger when being deployed, and an extension part 120 extended on both sides of the center part 110 and located above the legs of the passenger; and an inflator 200 connected to the airbag cushion 100 and providing an expansion force to the airbag cushion 100.

As illustrated in FIG. 1, the airbag cushion 100 is installed in the center of or around the front part of the seat cushion 700, is deployed upward between the legs of the passenger when a vehicle crash accident occurs, and supports forward movement of the passenger's lower body. Specifically, the airbag cushion 100 is formed with the center part 110 being deployed between the passenger's legs and the extension part 120 being deployed on both sides of the center part 110 and located above the passenger's legs to support the passenger's legs.

The center part 110 may prevent the passenger from sliding forward in a state where the passenger is in a relaxation posture, and the extension part 120 is located above the passenger's legs and may support the upward movement of the legs. Accordingly, if the vehicle collision occurs in a state where the passenger is seated in the relaxation posture, the airbag cushion 100 supports the passenger's lower body, and thus may prevent a submarine phenomenon in which the passenger's body slides forward.

The inflator 200 is connected to the airbag cushion 100, receives a crash signal transferred from a detection sensor provided on the vehicle, and deploys the airbag cushion 100 through injection of gas into the airbag cushion 100. The inflator 200 is mounted on the seat cushion 700 together with the airbag cushion 100, and may promptly deploy the airbag cushion 100 by immediately injecting the gas into the airbag cushion 100. The inflator 200 is connected to the center part 110 to inject the gas into the inside thereof, and the center part 110 communicates with the extension part 120, so that the extension part 120 may be deployed after the deployment of the center part 110.

The inflator 200 is connected to the center part 110 of the airbag cushion 100, and may deploy the airbag cushion 100 upward from the seat cushion 700 through injection of the gas upward. Further, since the extension part 120, which is deployed on both sides from the center part 110, communicates with the center part 110, the center part 110 is preferentially deployed between the passenger's legs, and then the extension part 120 is deployed on both sides from the center part 110 to be deployed above the passenger's legs. Accordingly, the extension part 120 is not deployed between the passenger's legs, but the center part 110 is preferentially deployed, and then the extension part 120 is deployed above the passenger's legs. The seat cushion airbag may further include: a cushion housing 300 accommodating the airbag cushion 100 therein; and a cushion bracket 400 combining the cushion housing 300 and the inflator 200 with a front part of a seat frame 710 in a state where the airbag cushion 100 is accommodated in the cushion housing 300.

As illustrated in FIGS. 4 and 5, the airbag cushion 100 may be folded and accommodated in the cushion housing 300, and the airbag cushion 100 may be accommodated in the cushion housing 300 in a state where the extension part 120 is folded and the folded extension part 120 is tucked in the center part 110, so that when being deployed, the center part 110 may be preferentially deployed, and the extension part 120 may be deployed in sequence. The inflator 200 may be installed in the frame 710 of the seat cushion 700, and the inflator 200 combined by the cushion bracket 400 may be fixed to the frame 710 of the seat cushion 700 together with the cushion housing 300 located above. The seat cushion airbag may further include an internal tether 500 located inside the airbag cushion 100, and having a first end part connected to the frame 710 of the seat cushion 700 and a second end part connected to the extension part 120 to support the airbag cushion 100.

As illustrated in FIG. 3, the internal tether 500 may be located inside the airbag cushion 100, and may support the airbag cushion 100 in a manner that a first end part of the internal tether 500 is fixed to the frame 710 of the seat cushion 700 and a second end part thereof is branched to be connected to the extension part 120. Accordingly, when the airbag cushion 100 is deployed, the internal tether 500 may support the airbag cushion 100 inside the airbag cushion 100, and thus the airbag cushion 100 may block the movement of the passenger's lower body.

The internal tether 500 may include a first tether 510 having a first end part connected to the frame 710 of the seat cushion 700 and extended along the center part 110, a second tether 520 connected to a second end part of the first tether 510 and formed in a link structure to be folded before being deployed and to be deployed toward the extension part 120 when being deployed, and a third tether 530 extended from both end parts of the second tether 520 and connected to the extension part 120. The internal tether 500 may include the first tether 510, the second tether 520, and the third tether 530. The first tether 520 may have a first end part combined with the frame 710 of the seat cushion 700 and a second end part extended upward along the center part 110.

The second tether 520 may be extended on both sides from the end part of the first tether 510 to be extended up to the inside of the extension part 120, and the second tether 520 may be formed in a link structure to be folded together with the airbag cushion 100 when being folded and may be deployed together with the extension part 120 when being deployed. As an embodiment, the second tether 520 may be formed in a "W" shape, and respective links may be folded when being folded and may be deployed in a straight line when being deployed. The center part 110 may be connected to the second end part of the first tether 510.

Further, the third tether 530 may be extended on both end parts of the second tether 520 to be connected to the extension part 120. Accordingly, the airbag cushion 100 may be supported on the frame 710 of the seat cushion 700 by the internal tether 500 when being deployed, and the extension part 120 may be assisted to be deployed in sequence after the deployment of the center part 110 by the second tether 520 and the third tether 530.

The first tether 510 and the third tether 530 may be formed of a deformable fabric material, and the second tether 520 may be formed of a hard synthetic resin material. The first tether 510 and the third tether 530 may be made of a fabric material to form linear tethers, and may be folded together when the airbag cushion 100 is folded. The second tether 520 may be formed of a synthetic resin material in a link structure, and may assist the deployment of the extension part 120. The second tether 520 may be made of a hard material in addition to the synthetic resin material.

The seat cushion airbag may further include an external tether 600 formed with a support part 610 having a first end part connected to a rear end part of the frame 710 of the seat cushion 700 and extended toward a front end part of the frame 710 of the seat cushion 700, and a branch part 620 branched from a second end of the support part 610 toward the extension part 120 and connected to the extension part 120.

As illustrated in FIG. 2, the airbag cushion 100 is installed on the front part of the frame 710 of the seat cushion 700, and to externally support this, the external tether 600 has a first end part connected to the rear part of the frame 710 of the seat cushion 700 and a second end part connected to the airbag cushion 100 to move the airbag cushion 100 forward, to prevent the passenger's lower body from moving forward. Specifically, the external tether 600 is formed with the support part 610 having a first end part connected to the rear part of the frame 710 of the seat cushion 700, and the branch part 620 branched from a second end part of the support part 610 and connected to the extension part 120 to support the extension part 120.

As illustrated in FIGS. 1, 2, and 3, the extension part 120 may include a tether hole 121 penetrated by the branch part 620, and the branch part 620 may penetrate the tether hole 121 and may be connected to the extension part 120 through connection of respective end parts thereof to the internal tether 500. In order for the branch part 620 to exactly support the extension part 120, the tether hole 121 penetrated by the second end part of the branCh part 620 may be formed on the extension part 120, the second end part of the branch part 620 may be inserted into the extension part 120 through penetration of the tether hole 121, may be connected to the end part of the second tether 520, and may be connected to the extension part 120 by the third tether 530.

Accordingly, the external tether 600 may be inserted into the extension part 120 to be connected to the internal tether 500, and may be connected to the extension part 120 inside the extension part 120 so as to support the extension part 120. Further, the support part 610 is connected to the rear part of the frame 710 of the seat cushion 700, and thus may prevent the airbag cushion 100 from moving forward.

The seat cushion airbag may further include a cushion housing 300 accommodating the airbag cushion 100 therein and combined with the frame 710 of the seat cushion 700, and a lead hole 310 may be formed on the cushion housing 300 so that the external tether 600 passes through the lead hole 310 and is connected toward the rear end part of the seat frame 710. The external tether 600 may be connected to the frame 710 of the seat cushion 700 to be extended outside of the cushion housing 300 in a location different from the location of the airbag cushion 100, and the lead hole 310 being penetrated by the branch part 620 of the external tether 600 is formed on both sides of the cushion housing 300, so that the external tether 600 is extended out of the cushion housing 300, and the support part 610 is extended to the rear part of the frame 710 of the seat cushion 700. Accordingly, the airbag cushion 100 deploys the upper part of the cushion housing 300, and when being deployed, the external tether 600 is deployed together, and thus the external tether 600 may promptly support the airbag cushion 100.

The center part 110 may include a projection part 111 formed to project toward the passenger, and the projection part 111 may support the forward movement of a pelvis portion of the passenger. As illustrated in FIGS. 1 and 2, the projection part 111 is formed on the center part 110 to project toward the passenger to support the pelvis portion of the passenger, and when the passenger slides by an external impact and the airbag cushion 100 and the pelvis portion come in contact with each other, the projection part 111 may support the pelvis portion of the passenger against the impact.

A cushion detector 10 and a controller 20 according to an exemplary embodiment of the present disclosure may be implemented through a processor (not illustrated) configured to perform the following operations using a non-volatile memory (not illustrated) configured to store an algorithm configured to control operations of various constituent elements of the vehicle or data related to software commands for reproducing the algorithm and the data stored in the corresponding memory. Here, the memory and the processor may be implemented by separate chips. As an alternative, the memory and the processor may be implemented by an integrated single chip. The processor may take a form of one or more processors.

Figure 6:
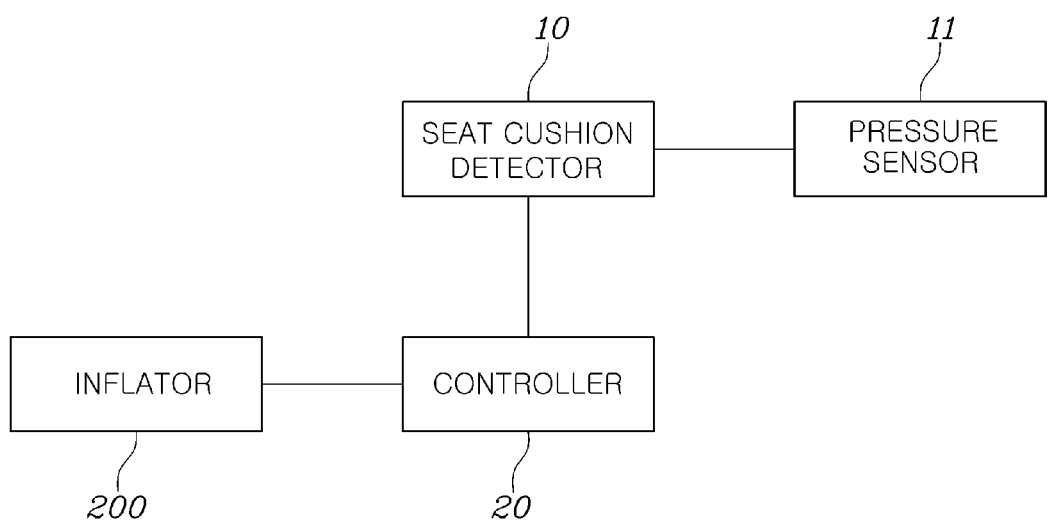
FIG. 6 is a configuration diagram of a vehicle cushion airbag control system according to an embodiment of the present disclosure.
Figure 7:
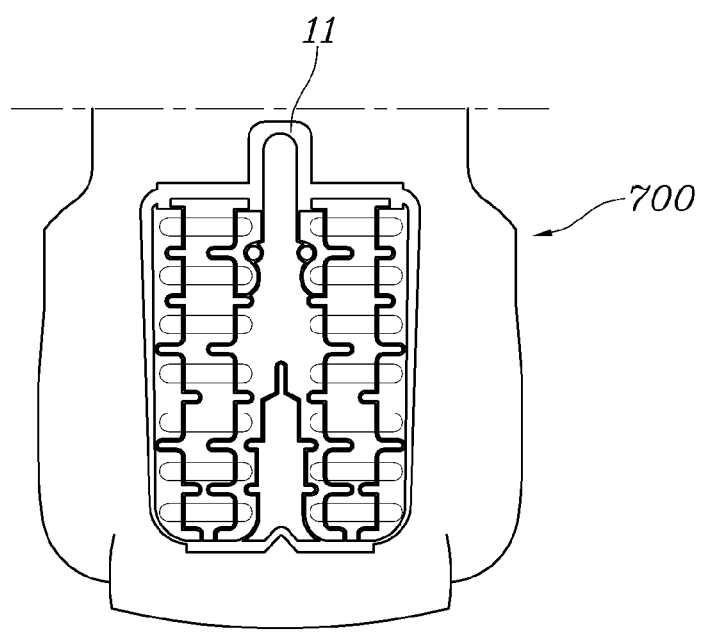
FIG. 7 is a view illustrating a pressure sensor of a seat cushion in a vehicle cushion airbag control system according to an embodiment of the present disclosure.

FIG. 6 is a configuration diagram of a vehicle cushion airbag control system according to an embodiment of the present disclosure, FIG. 7 is a view illustrating a pressure sensor 11 of a seat cushion in a vehicle cushion airbag control system according to an embodiment of the present disclosure, and FIG. 8 is view illustrating locations of the lower body of a passenger detected by a pressure sensor 11 in a vehicle cushion airbag control system according to an embodiment of the present disclosure.

Referring to FIGS. 6 to 8C, a system for controlling an airbag of a vehicle seat cushion 700 according to a preferred embodiment of the present disclosure will be described. A system for controlling an airbag of a vehicle seat cushion 700 according to the present disclosure may include: a cushion detector 10 connected to a pressure sensor 11 provided on the seat cushion 700 and configured to calculate a pressure distribution pressurized onto the seat cushion 700; and a controller 20 configured to execute deployment of an airbag cushion 100 in response to receiving an input of a vehicle crash signal based on the pressure distribution of the seat cushion 700 calculated by the cushion detector 10.

As illustrated in FIG. 7, the cushion detector 10 is connected to the pressure sensor 11 provided on the seat cushion 700, and may be configured to detect and calculate locations of the passenger's hips or the center of gravity. The controller 20 may be configured to determine whether to deploy the airbag cushion based on the locations of the passenger's hips or the center of gravity, and deploys the airbag cushion 100.

Figure 8A:
FIGS. 8A-8C are views illustrating locations of the lower body of a passenger detected by a pressure sensor in a vehicle cushion airbag control system according to an embodiment of the present disclosure.
Figure 8B:
Figure 8C:

Hereinafter, the configuration will be described, in which the controller 20 determines whether to deploy the airbag cushion 100 based on the locations of the passenger's hips or the center of gravity. As illustrated in FIGS. 8A-8C, the locations of the passenger's hips or the center of gravity are classified into (FIG. 8A) the location in the rear part, (FIG. 8B) the location on both sides of the front part, and (FIG. 8C) the location in the center of the front part.

When the cushion detector 10 calculates the pressure distribution toward a rear part of the seat cushion 700, the controller 20 may be configured to operate the airbag cushion not to be deployed when the crash signal is input. In FIG. 8A, the airbag cushion 100 is not deployed in a state where the passenger is seated on the seat cushion 700 in a normal seating posture, and the passenger may be protected by the vehicle airbag in the related art. When the cushion detector 10 calculates the pressure distribution toward both sides of a front part of the seat cushion 700, the controller 20 may be configured to operate the airbag cushion 100 to be deployed when the crash signal is input.

In FIG. 8B, when the passenger lies on his/her back and the passenger's center of gravity is detected on both sides of the front of the seat cushion 700, the airbag cushion 100 is deployed support the passenger's lower body so that the passenger's lower body does not move forward, and thus the submarine phenomenon may be prevented. When the cushion detector 10 calculates the pressure distribution toward a center of a front part of the seat cushion 700, the controller 20 may be configured to operate the airbag cushion 100 not to be deployed when the crash signal is input.

In FIG. 8C, when the passenger's center of gravity is detected in the location in which the airbag cushion 100 is deployed in a state where the passenger is seated with legs crossed or in an abnormal seating posture, the airbag cushion 100 is not deployed, and thus the passenger may be prevented from being injured due to a deployment pressure of the airbag cushion 100.

Figure 9:
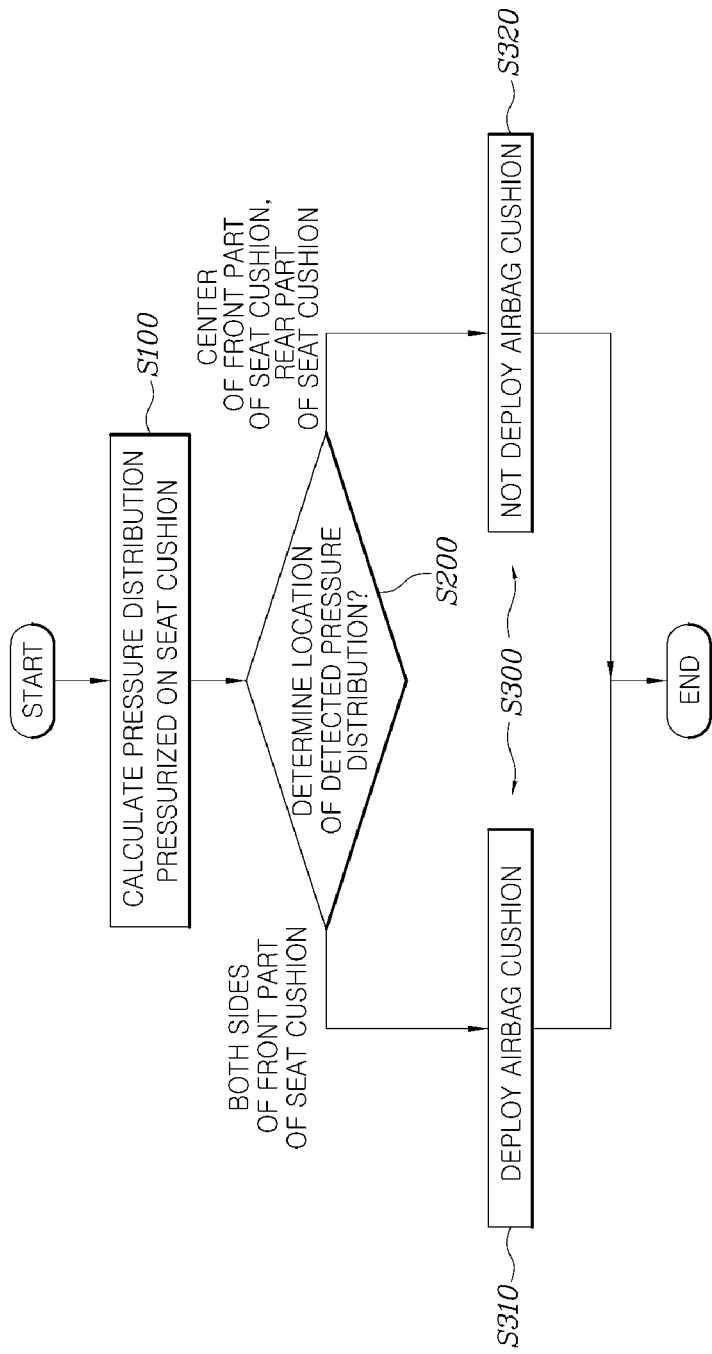
FIG. 9 is a flowchart of a method for controlling a vehicle cushion airbag control system according to an embodiment of the present disclosure.

FIG. 9 is a flowchart of a method for controlling a vehicle cushion airbag control system according to an embodiment of the present disclosure. Referring to FIG. 9, a method for controlling an airbag of a vehicle seat cushion 700 according to a preferred embodiment of the present disclosure will be described.

A method for controlling a vehicle seat cushion (700) airbag control system according to the present disclosure may include: detecting a cushion by calculating a pressure distribution pressurized onto a seat cushion 700 (S100); determining a location of the pressure distribution detected at the cushion detecting S100 (S200); and controlling deployment of an airbag cushion 100 based on the location of the pressure distribution determined at the determining S200 (S300).

The controlling (S300) may include operating the airbag cushion 100 not to be deployed in case that the pressure distribution toward a rear part of the seat cushion 700 is calculated at the cushion detecting S100 (S320). The controlling (S300) may include operating the airbag cushion 100 to be deployed when a crash signal is input in case that the pressure distribution toward both sides of a front part of the seat cushion 700 is calculated at the cushion detecting S100 (S310). The controlling (S300) may include operating the airbag cushion 100 not to be deployed in case that the pressure distribution toward a center of a front part of the seat cushion 700 is calculated at the cushion detecting S100 (S320).

Although specific embodiments of the present disclosure have been illustrated and described for illustrative purposes, those of ordinary skill in the art will appreciate that various modifications, additions and substitutions are possible, without departing from the scope and spirit of the present disclosure as disclosed in the accompanying claims.

What is claimed is:

1. A seat cushion airbag for a vehicle, comprising:
   an airbag cushion formed with a center part installed in a center of or around a front part of a seat cushion of a vehicle and located between legs of a passenger when being deployed, and an extension part extended on both sides of the center part and located above the legs of the passenger;
   an inflator connected to the airbag cushion and providing an expansion force to the airbag cushion; and
   an external tether formed with a support part having a first end part connected to a rear end part of a seat cushion frame and extending toward a front end part of the seat cushion frame, and a branch part branched from a second end of the support part toward the extension part and connected to the extension part.

2. The seat cushion airbag according to claim 1, wherein the inflator is connected to the center part to inject gas inside, and the center part communicates with the extension part, to deploy the extension part after deployment of the center part.

3. The seat cushion airbag according to claim 1, further comprising:
   a cushion housing accommodating the airbag cushion therein; and
   a cushion bracket combining the cushion housing and the inflator with a front part of a seat frame in a state where the airbag cushion is accommodated in the cushion housing.

4. The seat cushion airbag according to claim 1, further comprising an internal tether located inside the airbag cushion, and having a first end part connected to a frame of the seat cushion and a second end part connected to the extension part to support the airbag cushion.

5. The seat cushion airbag according to claim 4, wherein the internal tether includes a first tether having a first end part connected to the frame of the seat cushion and extended along the center part, a second tether connected to a second end part of the first tether and formed in a link structure so as to be folded before being deployed and to be deployed toward the extension part when being deployed, and a third tether extended from both end parts of the second tether and connected to the extension part.

6. The seat cushion airbag according to claim 5, wherein the first tether and the third tether are formed of a deformable fabric material, and the second tether is formed of a hard synthetic resin material.

7. The seat cushion airbag according to claim 1, wherein the extension part includes a tether hole penetrated by the branch part, wherein the branch part penetrates the tether hole, and is connected to the extension part through connection of respective end parts thereof to the internal tether.

8. The seat cushion airbag according to claim 1, further comprising a cushion housing accommodating the airbag cushion therein and combined with the seat cushion frame, wherein a lead hole is formed on the cushion housing to allow the external tether to pass through the lead hole.

9. The seat cushion airbag according to claim 1, wherein the center part includes a projection part formed to project toward the passenger, wherein the projection part supports a forward movement of a pelvis portion of the passenger.

10. The seat cushion airbag according to claim 1, wherein the extension part includes a vent hole formed thereon to exhaust a part of gas injected by the inflator.

11. A system for controlling a vehicle seat cushion airbag, comprising:
a seat cushion airbag, comprising;
an airbag cushion formed with a center part installed in a center of or around a front part of a seat cushion of a vehicle and located between legs of a passenger when being deployed, and an extension part extended on both sides of the center part and located above the legs of the passenger; and
an inflator connected to the airbag cushion and providing an expansion force to the airbag cushion;
a cushion detector connected to a pressure sensor provided on the seat cushion and calculating a pressure distribution pressurized onto the seat cushion; and
a controller configured to:
execute deployment of the airbag cushion through reception of an input of a vehicle collision signal based on the pressure distribution of the seat cushion calculated by the cushion detector; and
in response to the cushion detector calculating the pressure distribution toward a rear part of the seat cushion, operate the airbag cushion not to be deployed when the vehicle collision signal is input.

12. The system according to claim 11, wherein in response to the cushion detector calculating the pressure distribution toward both sides of the front part of the seat cushion, the controller is configured to operate the airbag cushion to be deployed when the vehicle collision signal is input.

13. The system according to claim 11, wherein in response to the cushion detector calculating the pressure distribution toward a center of the front part of the seat cushion, the controller is configured to operate the airbag cushion not to be deployed when the vehicle collision signal is input.

14. A method for controlling a vehicle seat cushion airbag control system of claim 11, the method comprising:
detecting a cushion by calculating a pressure distribution pressurized onto a seat cushion;
determining a location of the pressure distribution detected at the cushion detecting; and
controlling deployment of the airbag cushion based on the location of the pressure distribution determined at the determining.

15. The method according to claim 14, wherein the controlling includes operating the airbag cushion not to be deployed when the pressure distribution toward a rear part of the seat cushion is calculated at the cushion detecting.

16. The method according to claim 14, wherein the controlling includes operating the airbag cushion to be deployed when the vehicle collision signal is input when the pressure distribution toward both sides of the front part of the seat cushion is calculated at the cushion detecting.

17. The method according to claim 14, wherein the controlling includes operating the airbag cushion not to be deployed when the pressure distribution toward a center of the front part of the seat cushion is calculated at the cushion detecting.

* * * * *